United States Patent [19]

Adams et al.

[11] Patent Number: 5,341,684

[45] Date of Patent: Aug. 30, 1994

[54] PRESSURE SENSOR BUILT INTO A CABLE CONNECTOR

[75] Inventors: Victor J. Adams, Tempe; Sidney H. Griest; John W. Hart, Jr., both of Mesa, all of Ariz.

[73] Assignee: Motorola, Inc., Schaumburg, Ill.

[21] Appl. No.: 986,411

[22] Filed: Dec. 7, 1992

[51] Int. Cl.[5] .................... G01L 7/08; G01L 9/06
[52] U.S. Cl. ........................ 73/756; 73/431; 73/721; 73/727
[58] Field of Search .......... 73/756, 727, 726, 720, 73/721, 431; 338/4

[56] References Cited

U.S. PATENT DOCUMENTS

| | | | |
|---|---|---|---|
| 4,655,088 | 4/1987 | Adams | 73/756 |
| 4,756,193 | 7/1988 | Luettgen | 73/756 |
| 4,772,217 | 9/1988 | Peterson | 73/756 |
| 4,850,277 | 7/1989 | Luettgen et al. | 73/708 |
| 4,928,530 | 5/1990 | Lehto et al. | 73/756 |
| 4,965,777 | 10/1990 | Timossi et al. | 73/721 |
| 5,070,732 | 12/1991 | Duncan et al. | 73/431 |

*Primary Examiner*—Donald O. Woodiel
*Attorney, Agent, or Firm*—Joe E. Barbee

[57] ABSTRACT

A semiconductor sensor (10) is built into a cable connector to provide rapid and reliable attachment of the semiconductor sensor (10) into a monitoring or control system. The sensor (10) is mounted in a package (11) having cable connector leads (12, 13, 14) extending through the package (11). The semiconductor sensor (10) is electrically attached to the cable connector leads (12, 13, 14). A housing (20,30) surrounds the package (11) and provides a protective shroud for the cable connector leads (12, 13, 14).

5 Claims, 2 Drawing Sheets

PRESSURE SENSOR BUILT INTO A CABLE CONNECTOR

BACKGROUND OF THE INVENTION

This invention relates, in general, to semiconductor sensors, and more particularly, to the combination of a semiconductor sensor with a cable connector.

Typically, semiconductor sensors are packaged in packages which lend themselves to being mounted on printed circuit boards, or combined with other circuitry to provide a desired function. In many cases, the leads from the semiconductor sensor package are soldered or bonded to wire which are in turn attached to a cable connector which may be part of a wiring harness. Soldering the semiconductor sensor package to wires in a cable results in additional work and in turn reduces the reliability of the assembly because of the additional connection between the cable wires and the leads of the sensor package. Accordingly, it would be desirable to provide a semiconductor sensor arrangement which does not suffer from the shortcomings mentioned hereinbefore.

SUMMARY OF THE INVENTION

Briefly stated, the present invention provides a unique combination of a semiconductor sensor and a cable connector. A semiconductor sensor is mounted in a package which has cable connector leads extending through walls of the package. The package is in turn enclosed within a housing which not only protects the semiconductor sensor but also provides a protective cover for the cable connector leads which extend through the walls of the package.

DETAILED DESCRIPTION OF THE DRAWINGS

Figure 1:
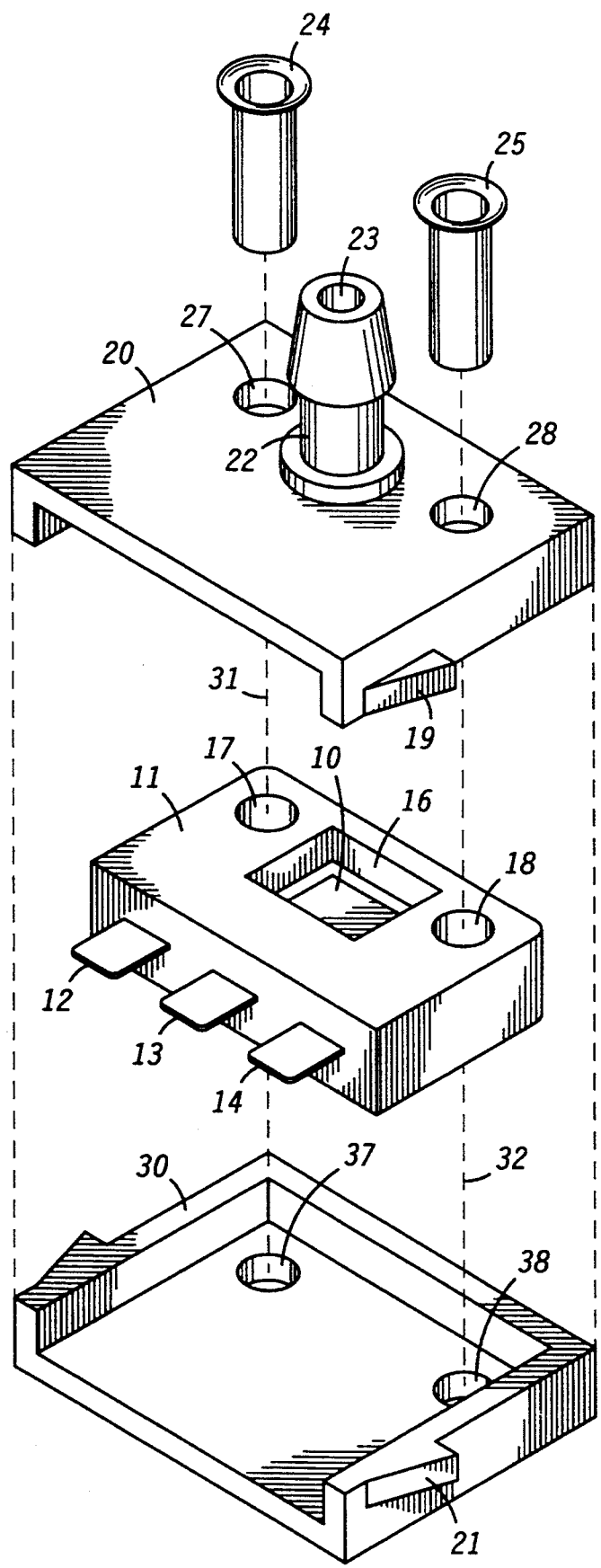
FIG. 1 is an exploded view of an embodiment in accordance with the present invention.

In the exploded view of FIG. 1 a semiconductor device 10 is shown mounted in a recess 16 of a package 11. Three cable connector leads 12, 13, and 14 are shown extending through a wall of package 11. In a preferred embodiment, cable connector leads 12, 13, and 14 are 0.4 millimeters thick and 3 millimeters wide; however, they can be any required size or configuration to mate with a corresponding cable connector. Semiconductor device 10 is a semiconductor sensor which, in a preferred embodiment, is a pressure sensor and is electrically connected to leads 12, 13, and 14 by typical wire bonding. Semiconductor device 10 may include, in addition to a pressure sensor, temperature compensation, an analog-to-digital converter, an amplifier, and a bridge composed of trimmed resistors. Package 11 also has holes 17 and 18 to receive eyelets 24 and 25, respectively.

A housing has a first or top portion 20 and a second or bottom portion 30. Top portion 20 has holes 27 and 28 to accommodate eyelets 24 and 25, respectively. In addition, top portion 20 has a port 22 having a passage 23 for conveying an external pressure to semiconductor sensor 10. Bottom portion 30 has holes 37 and 38. Top portion 20 is shown as having a tab or projection 19 which is used as a locking or retaining means to grasp a mating connector. Bottom portion 30 shows a similar projection 21. It should be noted that any suitable retaining means can be used depending on the configuration of the mating connector (not shown).

Dotted line 31 extends from eyelet 24 through hole 27, hole 17, and to hole 37 to illustrate the alignment of the exploded view. A dotted line 32 illustrates the alignment between eyelet 25, hole 28, hole 18, and hole 38. Eyelets 24 and 25 are used to hold the cable connector assembly of FIG. 1 together and give mechanical strength to the assembly. Screws or bolts could be used in place of eyelets 24 and 25; however, eyelets are much less expensive. Once portions 20 and 30 are assembled over semiconductor sensor package 11, eyelets 24 and 25 protrude through the bottom of portion 30 and once flared out they will retain portions 20 and 30 in place. In an alternate embodiment, portion 20 does not have holes 27 and 28 and portion 30 does not have holes 37 and 38. In such a case, it is not necessary to provide holes 17 and 18 in package 11. Portions 20 and 30 are then held together by an appropriate cement or epoxy. Typically, portions 20 and 30 are made by injection molded thermo plastic while package 11 can be made from a thermoset plastic or from thermo plastic. Package 11 needs to be made from a thermoset plastic which forms a good seal around cable connector leads 12, 13, and 14 to avoid leaks between package 11 and the cable connector leads. This is particularly important when the pressure being measured is lower than the ambient pressure surrounding the outer housing. A thermo plastic is used to make portions 20 and 30 since thermo plastics are cheaper than thermoset plastics and are easier to configure into complex configurations.

Figure 2:
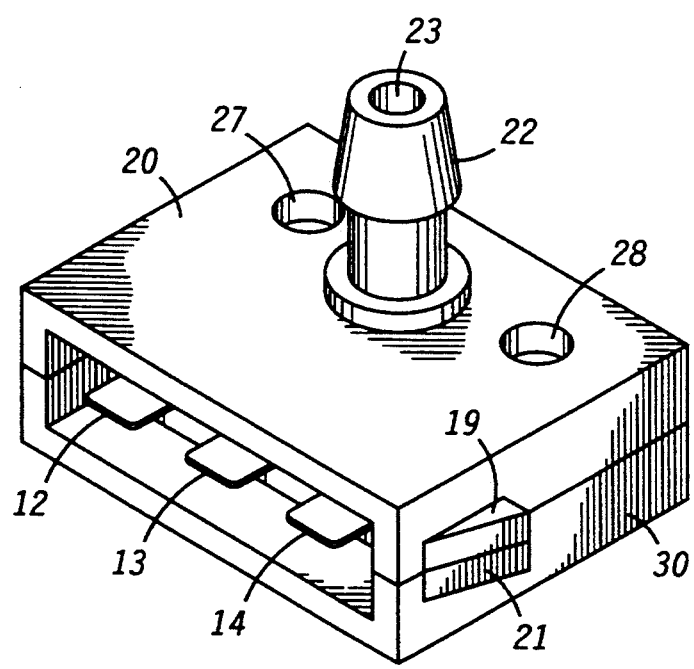
FIG. 2 is the assembled structure of FIG. 1.

FIG. 2 shows the cable connector and sensor of FIG. 1 assembled without eyelets 24 and 25. In a preferred embodiment, cable connector leads 12, 13, and 14 do not extend beyond the edge formed by portions 20 and 30. Such an arrangement affords a protective covering for leads 12, 13, and 14 and provides an environmental seal when mated to an all-weather connector. It should be noted that these leads are typically referred to as male type leads, whereas the leads from a cable which would connect with these leads would be referred to as female type leads. In some applications of a pressure sensor it is desirable to have an additional port such as port 22 extending from bottom portion 30 in alignment with semiconductor device 10. In such an arrangement there would be a small hole below semiconductor device 10 through package 11 which would align with a corresponding small hole in bottom portion 30. In many applications, it will be necessary to provide a hermetic seal between package 11 and at least top portion 20 to insure that cavity 16 is sealed to communicate only with opening 23 in port 22. Sealing top portion 20 to the perimeter of cavity 16 also protects semiconductor device or sensor 10 from any ambient environment.

By now it should be realized that there has been provided a semiconductor sensor built into an end of a cable connector to provide rapid and reliable interconnection of the semiconductor sensor and a monitoring or control system. The configuration of the assembled sensor and cable connector can be any suitable configuration to be compatible with a mating connector. However, having the sensor built into a cable connector has wide application, such as, in manufacturing, automotive applications, and consumer appliances to name a few.

We claim:

1. A pressure sensor built into a cable connector, comprising:
   a semiconductor pressure sensor that is on a semiconductor chip which also includes an analog-to-digital converter, a resistor bridge, an amplifier and temperature compensation;
   a pressure sensor package for receiving the semiconductor pressure sensor, wherein the pressure sensor package has walls through which cable connector leads extend, the walls forming an enclosure for the semiconductor pressure sensor and the semiconductor pressure sensor being wirebonded to the connector leads: and
   a housing for enclosing the pressure sensor package, the housing providing a protective cover for the connector leads, and the connector leads being for directly receiving a cable connector, and wherein the housing has a port for conveying an external pressure to be measured to the pressure sensor.

2. A cable connector and semiconductor sensor combination, comprising:
   a semiconductor sensor;
   a package for the semiconductor sensor having walls surrounding the semiconductor sensor and having cable connector leads extending through the walls, wherein the semiconductor sensor is electrically connected to the cable connector leads by wire bonding; and
   a housing surrounding the package and forming a protective cover for the portion of the cable connector leads extending through the walls, the housing having a top portion and a bottom portion, wherein the top portion and bottom portion are held in a fixed relationship.

3. The cable connector and semiconductor sensor coordination of claim 2 wherein the top portion and the package are bonded together to form a hermetic enclosure for the semiconductor sensor.

4. The cable connector and semiconductor sensor combination of claim 2 wherein the package is a thermoset plastic and the housing is a thermo plastic.

5. The cable connector and semiconductor sensor combination of claim 2 wherein the top portion includes a port for conveying pressure to be measured to the semiconductor sensor.

* * * * *